(12) United States Patent
Leibler et al.

(10) Patent No.: US 10,377,867 B2
(45) Date of Patent: Aug. 13, 2019

(54) PROCESSABLE SEMI-CRYSTALLINE POLYMER NETWORKS

(71) Applicants: ESPCI, Paris (FR); Centre National de la Recherche Scientifique, Paris (FR)

(72) Inventors: Ludwik Leibler, Paris (FR); François Tournilhac, Paris (FR); Mathieu Capelot, Paris (FR)

(73) Assignees: ESPCI, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 14/650,007

(22) PCT Filed: Dec. 6, 2013

(86) PCT No.: PCT/EP2013/075801
§ 371 (c)(1),
(2) Date: Jun. 5, 2015

(87) PCT Pub. No.: WO2014/086974
PCT Pub. Date: Jun. 12, 2014

(65) Prior Publication Data
US 2015/0315344 A1 Nov. 5, 2015

(30) Foreign Application Priority Data
Dec. 7, 2012 (EP) .................................... 12306544

(51) Int. Cl.
C08F 210/02 (2006.01)
C08J 5/00 (2006.01)
B29C 73/00 (2006.01)
C08J 3/24 (2006.01)

(52) U.S. Cl.
CPC ................ *C08J 5/00* (2013.01); *B29C 73/00* (2013.01); *C08F 210/02* (2013.01); *C08J 3/24* (2013.01); *C08J 2323/08* (2013.01)

(58) Field of Classification Search
None
See application file for complete search history.

(56) References Cited

U.S. PATENT DOCUMENTS

| | | | |
|---|---|---|---|
| 4,056,514 A * | 11/1977 | Strehler ................. | C08G 63/85 528/274 |
| 6,635,721 B1 * | 10/2003 | Moens ................. | C09D 167/00 427/385.5 |
| 8,258,254 B2 | 9/2012 | Inoue et al. | |
| 2004/0059060 A1 | 3/2004 | Chino et al. | |
| 2011/0015350 A1 | 1/2011 | Ellsworth et al. | |
| 2011/0237744 A1 * | 9/2011 | Ren ..................... | B01F 7/00808 524/605 |
| 2012/0309895 A1 | 12/2012 | Schmidt et al. | |
| 2013/0172480 A1 | 7/2013 | Schmidt et al. | |

FOREIGN PATENT DOCUMENTS

| | | |
|---|---|---|
| CN | 1134433 A | 10/1996 |
| DE | 102010040282 A1 | 3/2012 |
| JP | 09-012850 A | 1/1997 |
| JP | 2011-079943 A | 4/2011 |

OTHER PUBLICATIONS

Di Lorenzo, The Open Macromolecules Journal, 2010, 5, 15-21.*
Lu, Journal of the American Chemical Society, vol. 134, p. 8424-8427.*
Bikiaris, Polymer International, vol. 52, p. 1230-1239 (2003).*
Montarnal, Science, vol. 334, Nov. 18, 2011, p. 965-968 plus Supporting Material, p. 1-14. (Year: 2011).*
Li, J. Am. Oil Chem. Soc. (2013) vol. 90, p. 695-706 (Year: 2013).*
Trujillo-Lennon, Journal of Polymer Science: Part A: Polymer Chemistry, vol. 44, p. 3921-3929 (2006) (Year: 2006).*
Extended European Search Report for corresponding European Application No. 12306544.3 dated Jun. 25, 2013 8 pages.
International Search Report and Written Opinion for corresponding International Application No. PCT/EP2013/075801, dated Apr. 8, 2014.
Lu, Y.-X. et al., *Making Insoluble Polymer Networks Malleable via Olefin Metathesis*, Journal of the American Chemical Society, vol. 134 (May 2012), 8424-8427.
Ishida, K. et al., *Hard-Soft Conversion in Network Polymers: Effect of Molecular weight of crystallisable Prepolymer*, Macromolecules, vol. 43 (Dec. 2009)(Dec. 22, 2009) 1011-1015.
Ishida, K. et al., *Two-Way Conversion between Hard and Soft Properties of Semicrystalline Cross-Linked Polymer*, Mcaromolecules, vol. 41 (Jun. 2008) 4753-4757.
Raquez, J.-M. et al., *Design of Cross-Linked Sernicrystalline Poly(epsilon-caprolactone)-Based Networks with one Way and Two way Shape meory Properties through Diels-Alder reactions*, Chemistry an European Journal, vol. 17 (Jul. 2011) 10135-10143.
Paderni, K. et al., *Shape-memory polymer networks from sol-gel cross-linked alkoxysilane-terminated poly(epsilon-caprolactone)*, Journal of Material Science, vol. 47, (Feb. 2012) 4354-4362.
Cuevas, J.M. et al., *Development and characterization of semi-crystalline polyalkenamer based shape memory polymers*, Smart Materials and Structure, vol. 20 (Feb. 2011) 1-9.
Knight, P. T. et al., *PGLA-POSS End-linked Networks with tailored Degardation and shape memory Behavior*, Macromolecules, vol. 42, (Jul. 2009) 6596-6605.
Krevelen, D.W., *Properites of Polymers*, Elsevier (1990).

(Continued)

*Primary Examiner* — Robert C Boyle
(74) *Attorney, Agent, or Firm* — Alston & Bird LLP (57) ABSTRACT

Polymer network composition having a semi-crystalline covalently crosslinked polymer network including exchangeable covalent bonds and crosslinking bonds and at least an exchange reaction catalyst, wherein the number of crosslinking bonds is sufficient for the polymer network to be beyond the gel point and the number of exchangeable bonds is sufficient for the network to relax stresses and/or flow when conditioned at an appropriate temperature. Such compositions are characterized by the fact that the network is able to reorganize by exchange reactions that allow it to relax stresses and/or flow while maintaining network connectivity.

10 Claims, 2 Drawing Sheets

(56) References Cited

OTHER PUBLICATIONS

Brandrup, J. et al., *Polymer Handbook*, Wiley Interscience(1989).
Flory, P.J., *Principles of Polymer Chemistry*, Cornell University Press (1953).
Gedde, U. W., *Polymer Physics*, Kluwer Academic Publishers Dordrecht (1999).
Sperling, L.H., *Introduction to Physical Polymer Science*, Wiley Interscience (2001).
Cowie, J.M.G., *Polymers: Chemistry & Physics of Modern Materials*, Blackie (1991) Academic & Professional London.
Damien, M. et al., *Silica-Like Malleable Materials from Permanenet Organic Neworks*, Science vol. 334 (2011) 965.
Mathieu, C. et al., *Catalytic Control of the Vitrimer Glass Transition*, ACS Macro Let., vol. 1 (2012) 789.
Yi-Xuan, L., *Making Insoluble Polymer Networks Malleable via Olefin Metathesis*, J. Am. Chem. Soc., vol. 134 (2012) 8424.
Pascult, J.P. et al., *Epoxy Polymer*, Wiley-VCH, Weinheim (2010).
Perrin, R. et al., *Chimie industrielle* (1999).
Ishida, K. et al., *Two-Way Conversion between Hard and Soft Properties of Semicrystalline Cross-Linked Polymer*, Macromolecules, vol. 41 (Jun. 2008) 4753-4757.
Knight, P. T. et al., *PLGA-POSS End-linked Networks with Tailored Degardation and Shape Memory Behavior*, Macromolecules, vol. 42, (Jul. 2009) 6596-6605.
Lu, Y-X. et al., *Olefin Metathesis for Effective Polymer Healing via Dynamic Exchange of Strong Carbon-Carbon Double Bonds*, Journal of the American Chemical Society, vol. 134, (2012) 14226-14231.
Montarnal, D. et al., *Silica-Like Malleable Materials from Permanenet Organic Neworks*, Science vol. 334 (2011) 965-968.
Raquez, J.-M. et al., *Design of Cross-Linked Semicrystalline Poly(epsilon-caprolactone)-Based Networks with one Way and Two way Shape Memory Properties through Diels-Alder Reactions*, Chemistry an European Journal, vol. 17 (Jul. 2011) 10135-10143.
Office Action for corresponding European Application No. 12 306 544.3 dated Sep. 23, 2015.
Capelot, M. et al., *Metal-Catalyzed Transesterifcation for Healing and Assembling of Thermosets*, Journal of the American Chemical Society, vol. 134, No. 18, Apr. 2012, pp. 7664-7667.
Office Action for corresponding European Application No. 12 306 544.3 dated May 25, 2016.
Office Action for corresponding European Application No. 13 799 607.0 dated Jul. 29, 2016.
Office Action for corresponding European Application No. 13 799 607.0 dated Aug. 24, 2016.
Office Action for corresponding European Patent Application No. 13 799 607.0 dated Aug. 29, 2017, 4 pages.

\* cited by examiner

PROCESSABLE SEMI-CRYSTALLINE POLYMER NETWORKS

FIELD OF THE INVENTION

The invention relates to novel semi-crystalline covalently crosslinked polymer networks and polymer networks compositions characterized by the fact that the network is able to reorganize by exchange reactions that allow it to relax stresses and/or flow while maintaining network connectivity. Such networks, when combined with a catalyst promoting exchange reactions are characterized by their finite viscosity at elevated temperatures in spite of the crosslinking. These characteristics provide such networks remarkable properties: in particular, they have greater processing flexibility, better mechanical properties, improved chemical resistance.

BACKGROUND OF THE INVENTION

Thermoplastic polymers are non crosslinked polymers made by polymerization like polyethylene, by polycondensation like polyesters, or by modification of another polymer like poly-vinyl alcohol. These polymers can be processed at high temperature. Under molten form, they are extruded, molded, pressed, etc. . . . .

Thermoplastic semi-crystalline polymers generally contain domains where the polymer chains are crystalline and domains where the polymer chains are amorphous. They can be melted, they can be solubilized in a solvent. Thermoplastic semi-crystalline polymers are generally more ductile than amorphous glassy thermoplastics. They are characterized by a glass transition temperature and a melting temperature. Below the melting temperature, thermoplastic semi-crystalline polymers exhibit mechanical and thermal properties better than those of amorphous thermoplastic polymers. Above the melting temperature, thermoplastic semi-crystalline polymers flow and except for very high molecular weights, viscosity reduces abruptly near the melting point. Thermoplastic semi-crystalline polymers often exhibit better solvent resistance than amorphous thermoplastic polymers but still they are soluble in organic solvents, especially at high temperature.

A thermoplastic semi-crystalline polymer can be designed by selecting monomers and polymerization conditions well known to the skilled professional.

The skilled professional knows how to check that a polymer is semi-crystalline, notably the following methods are commonly used for this purpose: Differential Scanning calorimetry (DSC), Density measurements, X-Ray Diffractometry (DRX), Polarizing Optical Microscopy (POM), Transmission Electron Microscopy (TEM), solid state NMR, vibrational spectroscopy.

Crystallizable polymer chains means polymers able at certain conditions (temperature, pressure, annealings) to show a semi-crystalline state i.e. a coexistence of domains where the polymer chains are crystalline and domains where the polymer chains are amorphous.

The skilled professional knows the methods to produce non-crosslinked polymers by polymerizing in the absence of any crosslinker, by avoiding secondary crosslinking reactions or by maintaining crosslinking below the gel point. The skilled professional can check that a polymer is below the gel point by submitting the polymer to a solubility test. For each type of polymer, the skilled professional knows which solvent to select to perform this test.

Thermoplastic semi-crystalline polymers can be crosslinked to form a three-dimensional network. Compared to a non crosslinked polymer, the crosslinked polymer network is insoluble and more resistant to creep especially at high temperatures. A semi-crystalline polymer network can be obtained by following one of the guidelines here-under which are well-known to the skilled professional:

copolymerising or condensing bifunctional monomers known to form crystallizable polymer chains and polyfunctional (with functionality superior to 2) monomers or forming links between crystallizable polymer chains thanks to reactive functions present on said chains, or created by external stimuli such as temperature, electromagnetic radiation, electron beam or plasma.

reacting crystallizable polymer chains with a crosslinking agent such as oxygen, peroxides, sulfur.

modifying parts of a crystallizable polymer by simultaneous or sequencial cleavage reactions and crosslinking reactions.

Once crosslinked beyond the gel point by these methods, the polymer becomes insoluble but it is no longer a thermoplastic. Above the melting temperature, the polymer does not flow or relax stresses.

The skilled professional knows how to check that he has obtained a semi-crystalline polymer network:

Crystallinity can be confirmed by any of the above-mentioned methods. It can be checked that the polymer is beyond the gel point (i.e. a network has been formed) by placing the polymer network in a solvent known to dissolve non-crosslinked polymers of the same nature. If the polymer swells instead of dissolving, the skilled professional knows that a network has been formed.

The skilled professional can refer to the following handbook to select crystallizable polymer sequences: D. W. van Krevelen *Properties of Polymers* Elsevier, Amsterdam 1990, J. Brandrup, E. H. Immergut *Polymer Handbook* Wiley Interscience New York 1989. The skilled professional can refer to the following manuals to perform any of these synthesis or test steps: P. J. Flory *Principles of Polymer Chemistry* Cornell University Press Ithaca-NY 1953, U. W. Gedde *Polymer Physics* Kluwer Academic Publishers Dordrecht 1999, L. H. Sperling *Introduction to Physical Polymer Science* Wiley Interscience New-York 2001, J. M. G. Cowie *Polymers: Chemistry & Physics of Modern Materials* Blackie Academic & Professional London 1991. However, there remains a need for better ways to control the viscosity, the plasticity and the insolubility of semi-crystalline polymers, in temperature ranges wider than those known today. The goal is to have more flexibility in modes of implementation of these materials.

Figure 3:
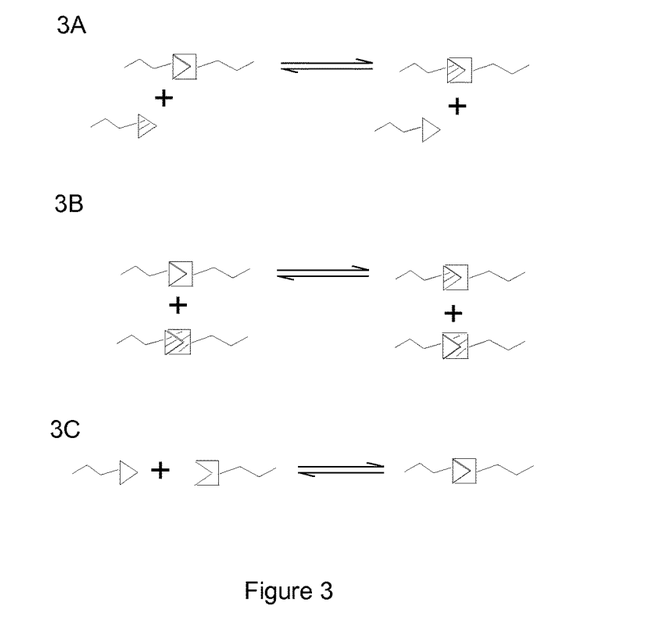

Some thermoreversible semi-crystalline crosslinked polymer networks have been disclosed in the past: US2004/0059060; K. Ishida et al., Macromolecules, 2010, 43, 1011-1015; K. Ishida et al., Macromolecules, 2008, 41, 4753-4757; CN1134433; J.-M. Raquez et al., Chem. Eur. J. 2011, 17, 10135-10143; US2011/015350; US2012/309895; DE10 2010 040 282; U.S. Pat. No. 8,258,254. They are based on crosslinks dissociation by temperature change, a reaction scheme which is illustrated in FIG. 3C. Most networks disclosed therein have their reversibility based on a reversible Diels-Alder reaction. When dissociated by application of heat, network connectivity is reduced, such networks are disconnected to a point below the gel point in order to permit reshaping and/or recycling.

Networks disclosed in US2011/015350 are based on metathesis and metathesis catalysts but again, the goal is to allow the decrosslinking of a polymer network. The use of catalysts for promoting exchange reactions between olefin double bonds is neither mentioned nor suggested in this document. Compositions made by crosslinking a semi-crystalline polymer disclosed in this document have an uncertain level of crosslink density. The exact composition, the molar average molecular weight and the number average molecular weight, the number of olefinic side chains and the degree of crystallinity of the polymers are not provided. Therefore it is not possible to determine if they are beyond the gel point, if the number of olefinic double bonds in enough to have an influence on flow properties and whether the composition is semi-crystalline after crosslinking Paderni K. et al., J. Mater. Sci. (2012) 47:4354-4362, discloses semi-crystalline polymers with shape memory based on alkoxysilane-terminated poly(ε-caprolactone).

J. M. Cuevas et al., Smart Materials and Structure, vol. 20, (2011), p. 1-9, discloses shape memory polymers based on polyalkenamer crosslinked semi-crystalline networks.

P. T. Knight et al., Macromolecules, 2009, 42, 6596-6605 discloses oligosesquioxane-terminated poly(lactide-co-glycolide) semi-crystalline networks with shape memory properties.

After having been submitted to a transformation under application of heat, when re-heated, such networks recover their initial shape. In such networks, crosslinks do not exchange, application of heat above the melting temperature produces deformation by melting of the crystalline fragments, and recovery of the initial shape is made possible also by the application of heat. When the network is set at a fixed temperature, no relaxation of strain or flowing of the network is observed. In such networks, there does not exist a temperature at or above which the viscosity of the polymer network composition is inferior or equal to $10^{11}$ Pa·s.

The inventors have now discovered that networks of semi-crystalline polymers incorporating exchangeable covalent bonds make it possible to obtain semi-crystalline polymers with improved properties.

This finding is surprising: indeed, one could expect that the presence of crosslinks and covalent exchangeable bonds degrades the materials properties, including mechanical properties. Crosslinking is known to reduce crystallinity of polymers. It was expected a reduction in the crystalline, or ordered, character of these polymers, and a subsequent reduction of thermal resistance. Thermal resistance is notably evaluated by measuring the Heat Distorsion Temperature (HDT) of the polymer composition, notably by the ASTM-D648 method. But, surprisingly, the inventors have found that in the presence of crosslinks and exchangeable covalent bonds the crystalline nature of the polymers is preserved and new properties such as an increase in thermal resistance and in mechanical properties can be noted. Additionally, the presence of exchangeable covalent bonds provides these polymer networks with more flexible conditions of processability.

Polymer network compositions of the invention, wherein a semi-crystalline polymer network is associated to a catalyst, are characterized by the fact that there exists a temperature $T_1$, above which the viscosity is inferior or equal to $10^{11}$ Pa·s.

Polymer networks of the invention are characterized by a glass transition temperature Tg, and a melting temperature Tf.

The temperature $T_1$ may be adjusted, in particular it can be adjusted well above or close to the melting temperature of the network.

These features, which are described in more detail below can be adjusted to modulate mechanical and thermal properties of the polymer network. When $T_1$ occurs close to Tf, the system, in comparison to crosslinked semicrystalline polymers of the prior art, shows good processability above Tf while maintaining an excellent solvent resistance. When $T_1$ occurs well above Tf, the system shows, in comparison to its non-crosslinked counterpart, better solvent resistance, better creep resistance due to viscosity higher than $10^{11}$ Pa·s between Tf and $T_1$ and good processability above $T_1$. In all cases, the polymer's processability is improved: the polymer networks can have more flexible and controlled modes of transformation thanks to a better control of the viscosity and plasticity of the network In comparison to crosslinked semicrystalline polymer compositions of the prior art, polymer network compositions according to the invention also present at equivalent degree of crystallinity, decreased thermal expansion coefficient between Tg and Tf. They also present improved chemical properties: increased solvent resistance, and at equivalent degree of crystallinity, increased impermeability to gases and liquids.

The invention also relates to a method of crosslinking semi-crystalline polymers in presence of an appropriate catalyst, wherein the number of crosslinking bonds is sufficient for the polymer network to be beyond the gel point and the number of exchangeable bonds is sufficient for the network to relax stresses and/or flow when at an appropriate temperature.

SUMMARY OF THE INVENTION

The object of the present invention is to alleviate at least partly the above mentioned drawbacks of thermoplastic crystalline or semi-crystalline polymers.

The invention is related to:

A polymer network composition comprising a semi-crystalline covalently crosslinked polymer network and at least a catalyst, characterized in that there exists a temperature noted $T_1$, at or above which the polymer composition is able to relax at least 90% of stresses in less than 72 hours, and at or above which the viscosity of the polymer network composition is inferior or equal to $10^{11}$ Pa·s.

The invention is also related to a polymer network composition comprising a semi-crystalline covalently crosslinked polymer network including exchangeable covalent bonds and crosslinking bonds and at least an exchange reaction catalyst, wherein the number of crosslinking bonds is sufficient for the polymer network to be beyond the gel point and the number of exchangeable bonds is sufficient for the network to relax stresses and/or flow when conditioned at an appropriate temperature.

The invention is also related to articles resulting from processing a polymer network composition according to the invention, wherein processing includes a curing step so that the gel point of the polymer network is reached or exceeded.

Further, the invention is related to a method of crosslinking semi-crystalline polymers, wherein the number of crosslinking bonds is sufficient for the polymer network to be beyond the gel point and the number of exchangeable bonds is sufficient for the network to relax stresses and/or flow when in presence of an exchange reaction catalyst and at an appropriate temperature.

Preferred embodiments comprise one or more of the following features:

Under application of a constant load at a temperature equal to or higher than $T_1$, polymer network composition is able to creep by more than 3%.

The number of exchangeable bonds $n_L$ is superior or equal to 15% of the number of crosslinking points $n_C$ in the network.

The polymer network comprises:

Reactive groups R capable of participating in an exchange reaction with at least one bond L.

The exchange reaction catalyst is selected from molecules which verify the following condition: when the exchange reaction is achieved in the presence of the catalyst, the time for which the exchange ratio reaches 90% is less than 5 hours.

The polymer network comprises polymeric crystallizable fragments selected from:

polyolefins,
polyvinyl esters of general formula —[RCOOCHCH2]-,
polyvinyl esters derivatives,
vinyl polymers with a regular chain structure,
copolymers of one or several monomers of the above-mentioned chemical families,
poly vinyl ethers,
polyethers,
poly vinyl halides,
fluorinated polymers with a highly fluorinated main chain,
fluorinated polymers with highly fluorinated side chains,
polyesters,
polyamides,
thermostable aromatic,
thermoplastic polyimides.

The polymer network comprises polymeric crystallizable fragments selected from:

polyethylene, polypropylene,
polyvinylacetate,
polyvinyl alcohol;
syndiotactic polystyrene, isotactic polybutylene, isotactic poly methyl methacrylate (PMMA),
partially hydrolyzed vinyl acetate, ethylene vinyl alcohol (EVOH) and ethylene vinyl acetate (EVAc) copolymers,
poly vinyl n-alkyl ethers,
poly(ethylene oxide) (PEO),
poly vinyl chloride (PVC), poly vinyl fluoride, poly vinylidene chloride (PVDC), chlorinated poly vinyl chloride (CPVC), poly vinylidene fluoride (PVDF), poly trifluoroethylene (PTrFE), poly trifluorochloroethylene, poly tetrafluoroethylene (PTFE),
poly hexafluoropropene (PHFP), poly(3,3,3-trifluoropropene), poly(1-chloro-3,3,3-trifluoropropene), poly(2-chloro-3,3,3-trifluoropropene), poly perfluoroacrylonitrile, poly methyl trifluoroacrylate,
fluorinated (meth)acrylates, fluorinated vinyl esters, fluorinated styrenic polymers,
polyethylene terephtalate (PET), poly(trimethylene terephthalate) (PTT), poly(butylene terephthalate) (PBT), poly(ethylene naphthalate) (PEN), polylactide (PLA), and poly(alpha-hydroxyalkanoates) (PHA),
polytetramethylene adipamide or nylon 4,6, polyhexamethylene adipamide or nylon 6,6, polyhexamethylene sebacamide or nylon 6,10, poly(hexamethylenediamine-co-dodecanedioic acid) or nylon 6,12, polycaprolactam or nylon 6, polyheptanolactam or nylon 7, polyundecanolactam or nylon 11, and polydodecanolactam or nylon 12,
polyetheretherketone (PEEK), polyetherketoneketone (PEKK), polyphenylene sulfide (PPS),
polyether imide (PEI), polyamide imide.

The polymer network is characterized by an enthalpy of melting as measured by DSC superior or equal to 5 J/g.

The exchangeable covalent bonds are selected from: —C=C— ethylenic double bonds, —C≡C— acetylenic double bonds, —COO— ester bonds, —CONH— amide bonds, —C=N— imine bonds, —C=N—NH— hydrazone bonds, —C=N—O— oxime bonds, —C(OH)—C(CHO)— aldol bonds, —COO—CH$_2$—C=C— allyl ester bonds, —COS— thioester bonds, —O—C(OR')— acetal and hemiacetal bonds, —Si—O—Si— siloxane bond, —S—O—C— sulphonate and sulphate bonds.

The exchangeable covalent bonds are selected from: —C=C— ethylenic double bonds, —COO— ester bonds and R is selected from: a double bond —C=C—, a hydroxyl group —OH.

The exchange reaction catalysts are present in an amount ranging from 0.1 mol % to 25 mol % relative to the total molar amount of exchangeable bonds L contained in the polymer network.

The polymer network composition further comprises at least one additive selected from: polymers, pigments, dyes, fillers, plasticizers, fibres, flame retardants, antioxidants, lubricants, wood, glass, metals.

The process for transforming an article according to the invention comprises the application to the article of a mechanical constraint at a temperature (T) above room temperature.

A method of crosslinking semi-crystalline polymers and comprising the following steps:

a) the preparation of the polymer network composition by mixing the components in a one-step or sequential manner,
b) the forming of the composition obtained from step a),
c) the application of energy for hardening the polymer network composition,
d) cooling of the hardened polymer network composition, wherein the gel point is not reached at the end of step a) but reached at the end of step c).

Further features and advantages of the invention will appear from the following description of embodiments of the invention, given as non-limiting examples, with reference to the accompanying drawings listed hereunder.

BRIEF DESCRIPTION OF THE DRAWINGS

FIG. 3: 3A representation of the exchange reaction of a covalent bond with a reactive group at constant connectivity; 3B representation of the exchange reaction of a covalent bond with another covalent bond at constant connectivity; 3C representation of a reversible reaction of forming and disconnecting a covalent bond.

DETAILED DESCRIPTION OF THE INVENTION

A first object of the invention is a semi-crystalline covalently crosslinked polymer network composition comprising a polymer network and a catalyst, characterized in that there exists a temperature noted $T_1$, at or above which the polymer composition is able to relax at least 90% of stresses when submitted to a constant strain at constant temperature in less than 72 hours, and at or above which the viscosity of the polymer network composition is inferior or equal to $10^{11}$ Pa·s.

The polymer network composition comprises a semi-crystalline covalently crosslinked polymer network and at least a catalyst, it is capable to relax stresses and/or flow at a set temperature and at constant strain while maintaining network connectivity. The temperature noted $T_1$ is close to or above the melting point of the polymer network, preferably above the melting point of the polymer network.

At or above $T_1$ the network is insoluble in a solvent of the polymer.

Preferably, the polymer network composition, under application of a constant load at a temperature close to or higher than $T_1$, is able to creep by more than 3%.

Another object of the invention is a covalently crosslinked semi-crystalline polymer network composition comprising a polymer network including exchangeable bonds and cross-linking bonds and at least an exchange reaction catalyst, wherein the number of crosslinking bonds is sufficient for the polymer network to be beyond the gel point and the number of exchangeable bonds is sufficient for the network to relax stresses and/or flow when conditioned at an appropriate temperature.

In all the description, by polymer is meant a homopolymer or a copolymer or a mixture of homopolymer and copolymer.

A network is formed when polymer chains are crosslinked in such a manner that there is a continuous path formed from a succession of monomers united by bridges, this path traversing the sample from end to end. When the polymer chains are crosslinked by a crosslinking agent, these monomers may originate from any of the network precursors: from the polymer chains and/or from the crosslinker. A person skilled in the art knows theoretical and/or empirical guides for determining the compositions that can produce a polymer network (cf. for example, P. J. Flory *Principles of Polymer Chemistry* Cornell University Press Ithaca-NY 1953).

The invention is related to polymer networks crosslinked through covalent crosslinkers. Non covalent bonds can also be present in the network, but, according to the invention, polymer crosslinking covalent bonds should be present in a sufficient manner to form a polymer network.

In practice, the formation of a polymer network is ensured by a solubility test. It can be ensured that the polymer is beyond the gel point (i.e. a network has been formed) by placing the polymer network in a solvent known to dissolve non-crosslinked polymers of the same chemical nature. If the polymer swells instead of dissolving, the skilled professional knows that a network has been formed.

According to the invention, at least part of covalent bonds which constitute the polymer network are exchangeable bonds. The exchangeable character of a bond is directly related to the nature of the catalyst present in the composition. A bond is exchangeable, according to the invention, if the exchange reaction can be promoted by the catalyst present in the composition.

As illustrated in FIG. 3A and FIG. 3B, the exchangeable bond is capable of reacting with another exchangeable bond (3B) or with a reactive group (3A) in a reaction wherein the connectivity is maintained. When a network based on exchangeable reactions is heated, the connectivity of the network is maintained constant under application of heat. Only the speed of exchange is increased by the application of heat.

Catalysts of the polymer network compositions are selected as a function of exchangeable crosslinking bonds incorporated in the polymer network, among catalysts which promote exchange reactions in the polymer network.

Polymer network compositions according to the invention are characterized in that there exists a temperature noted $T_1$, at or above which, under application of a 1% static strain, the polymer composition is able to relax at least 90% of stresses in less than 72 hours. To the difference of memory shape polymer characterization, the test consisting in the application of a strain and subsequent stress relaxation is achieved at a constant temperature.

Polymer network compositions according to the invention are characterized in that there exists a temperature noted $T_1$, at or above which the viscosity of the polymer network composition is inferior or equal to $10^{11}$ Pa·s.

$T_1$ is different for each polymer network composition.

Preferably polymer network compositions according to the invention are characterized in that there exists a temperature noted $T_1$, at or above which, under application of a 1% static strain, the polymer composition is able to relax at least 90% of stresses in less than 48 hours.

Prior art crosslinked semi-crystalline polymer compositions, even when the temperature is raised above Tf, do not relax stresses or flow, because the network connectivity is set. A constraint can be imposed on such a network when heated above melting temperature Tf, further cooling the network below Tf sets the constraint. A reversal of this process by re-heating can occur to recover the initial shape. This reshaping is due to reorganization of semi-crystalline fragments, not to network relaxation. And for all polymer compositions there exists a temperature above which chemical degradation occurs. On the contrary, compositions according to the invention have the ability to relax stresses and/or flow, at a temperature below that at which chemical degradation occurs, which is practically demonstrated by heating the polymer at or above $T_1$ and measuring a viscosity inferior or equal to $10^{11}$ Pa·s and by observing that, when a 1% strain is applied to the composition, at a set temperature superior or equal to $T_1$, without changing the temperature, the composition is able to relax at least 90% of the stresses in 72 hours. The measure of viscosity (and the quantitative evaluation of stress relaxation) is performed through torque measurements in isothermal conditions using a rheometer operating in the Ø=25 mm parallel planes geometry in the shear stress relaxation mode.

The viscosity η, expressed in Pa·s, is determined from stress relaxation experiments by using the formula:

$$\eta = \sigma_0 \times \tau_{0.5}/\gamma$$

where

γ, a dimensionless number is the value of the applied strain, preferably equal to 0.01.

$\sigma_0$, expressed in pascals (Pa), is the value of stress measured within 1 second after application of the strain.

$\tau_{0.5}$, expressed in seconds (s) is a value of time, measured from the instant when the strain has been applied for which the value of stress is equal to 50% (±2%) the value of the initial stress $\sigma_0$.

Preferably the sample for stress relaxation experiments is prepared by curing a liquid reactive mixture inside the rheometer in order to insure a good mechanical contact between the parallel plates and the sample. When it is not possible to prepare the sample for stress relaxation experiments inside the rheometer, for instance when strong gas evolutions occur or when the material is not obtained in its final form by heating a reactive liquid, disk-like specimens have to be prepared ex situ and adjusted inside the rheometer prior to stress relaxation experiments. In this case, the skilled professional knows how to check that there is actually a good mechanical contact between the sample and the parallel plates, for instance, by performing stress relaxation experiments at different values of strains or by performing rheological measurements in the oscillatory mode prior to stress relaxation experiments. Such rheological measurements are achieved at constant temperature.

The viscosity can be measured either by stress relaxation or creep experiments as described in the following references:
Montarnal, Damien; Capelot, Mathieu; Tournilhac, Francois; Leibler, Ludwik; Silica-Like Malleable Materials from Permanent Organic Networks, *Science* 2011, 334, 965; Capelot, Mathieu; Unterlass, Miriam M.; Tournilhac, Francois; Leibler, Ludwik; Catalytic Control of the Vitrimer Glass Transition, ACS Macro Let., 2012, 1, 789; Lu, Yi-Xuan; Tournilhac, Francois; Leibler, Ludwik; Guan, Zhibin; Making Insoluble Polymer Networks Malleable via Olefin Metathesis, *J. Am. Chem. Soc.* 2012, 134, 8424. Creep experiments may be used also to confirm that the sample is able to flow over large deformations. Preferably, under application of a constant load at a temperature close to or higher than $T_1$ the polymer network compositions of the invention are able to creep by more than 3%.

Crystalline or semi-crystalline polymers are characterized by a melting temperature. Melting occurs when polymer chains undergo the transition from an ordered crystalline state to a disordered liquid state. The melting temperature is evaluated by differential scanning calorimetry (DSC), by dynamic mechanical analysis (DMA), by X-ray diffraction (XRD) or by polarizing optical microscopy (POM). Notably, it can be measured by the DIN 53765 method (DSC), wherein it is measured as the peak temperature.

More specifically, the invention relates to semi-crystalline covalently crosslinked polymer networks comprising:
Exchangeable covalent bonds L.
According to a particular embodiment, the semi-crystalline covalently crosslinked polymer networks of the invention comprise:
Exchangeable covalent bonds L, and
Reactive groups R capable of participating in an exchange reaction with at least one bond L.
Polymer Chains:
Semi-crystalline polymer materials comprise crystalline areas and amorphous areas. They can be designed by a selection of monomers or polymer fragments which are assembled by methods well known to the skilled professional.

A covalently crosslinked semi-crystalline polymer network can, for example and in a non exhaustive manner, be obtained by following one of the guidelines here-under which are well-known to the skilled professional:
copolymerising or condensing bifunctional monomers known to form crystallizable polymer chains and polyfunctional (with functionality superior to 2) monomers or
forming links between crystallizable polymer chains thanks to reactive functions present on said chains, or created by external stimuli such as temperature, electromagnetic radiation, electron beam or plasma.
reacting crystallizable polymer chains with a crosslinking agent such as oxygen, peroxides, sulfur.
modifying parts of a crystallizable polymer by simultaneous or sequencial cleavage reactions and crosslinking reactions.

Semi-crystalline polymers are generally based on crystallizable polymer chains showing an at least partially stereoregular and tactic chain structure. Atactic or non stereoregular polymer chains can also lead to semi-crystalline polymer materials when they are laterally grafted with crystallizable side-groups.

Polymer materials comprising crystallizable polymer chains include polymers entirely composed of crystallizable polymer chains and they also include polymer materials composed of both crystallizable polymer chains and non-crystallizable polymer chains. Crystallizable polymer chains permit polymer crystallization in appropriate conditions which are familiar to the skilled professional.

Crystallizable polymer chains can be grafted at the extremities of any other polymer chain or as lateral chains grafted on a main polymer chain or it can be present as one or several blocks among other polymeric blocks in the polymer network. Crystallizable polymer fragments can be spread all along a polymer chain in a copolymer also comprising other types of monomers and the interaction between polymer chains leads to the formation of crystalline areas.

Crystallizable fragments and notably crystallizable side-groups and crystallizable main-chain fragments can be selected among polymeric and non polymeric fragments.

Among non polymeric crystallizable fragments one can mention: alkyl chains, perfluoroalkyl chains, partially fluorinated alkyl chains. Generally they are selected among $C_8$-$C_{24}$ linear chain acids and alcohols.

Among polymeric crystallizable fragments one can mention:
polyolefins, like for example polyethylene, polypropylene and particularly the highly tactic forms of polypropylene, 1,4-trans polyisoprene, hydrogenated polybutadiene.
polyvinyl esters of general formula —[RCOOCHCH$_2$]—, like for example polyvinylacetate;
polyvinyl ester derivatives like polyvinyl alcohol;
other vinyl polymers with a regular chain structure, like for example syndiotactic polystyrene, isotactic polybutylene, isotactic poly methyl methacrylate (PMMA).
copolymers of one or several monomers of the above-mentioned chemical families like for example partially hydrolyzed polyvinyl acetate as well as ethylene vinyl alcohol (EVOH) and ethylene vinyl acetate (EVAc) copolymers.
poly vinyl ethers like for example poly vinyl n-alkyl ethers
polyethers like for example poly(ethylene oxide) (PEO)
poly vinyl halides like for example poly vinyl chloride (PVC), poly vinyl fluoride, poly vinylidene chloride (PVDC), chlorinated poly vinyl chloride (CPVC), poly vinylidene fluoride (PVDF), poly trifluoroethylene (PTrFE), poly trifluorochloroethylene, poly tetrafluoroethylene (PTFE)
other fluorinated polymers with a highly fluorinated main chain like for example poly hexafluoropropene (PHFP), poly(3,3,3-trifluoropropene), poly(1-chloro-3,3,3-trifluoropropene), poly(2-chloro-3,3,3-trifluoropropene), poly perfluoroacrylonitrile, poly methyl trifluoroacrylate.
other fluorinated polymers with highly fluorinated side chains like fluorinated (meth)acrylates, fluorinated vinyl esters, and fluorinated styrenic polymers.
polyesters like for example polyethylene terephtalate (PET), poly(trimethylene terephthalate) (PTT), poly (butylene terephthalate) (PBT), poly(ethylene naphthalate) (PEN), polylactide (PLA), and poly(alpha-hydroxyalkanoates) (PHA);

polyamides like for example polytetramethylene adipamide or nylon 4,6, polyhexamethylene adipamide or nylon 6,6, polyhexamethylene sebacamide or nylon 6,10, poly(hexamethylenediamine-co-dodecanedioic acid) or nylon 6,12, polycaprolactam or nylon 6, polyheptanolactam or nylon 7, polyundecanolactam or nylon 11, and polydodecanolactam or nylon 12;

thermostable aromatic polymers like for example polyetheretherketone (PEEK), polyetherketoneketone (PEKK), polyphenylene sulfide (PPS)

thermoplastic polyimides like for example polyether imide (PEI), polyamide imide.

Favorite crystallizable fragments include: polyolefines, fluorinated polymers, polyesters, polyamides, polyimides, thermostable aromatic polymers, polyvinyl alcohols and copolymers thereof.

To ensure that the polymer is semi-crystalline, notably the following methods are commonly used: Differential Scanning calorimetry (DSC), Dynamic Mechanical (Thermal) Analysis (D(T)MA), X-Ray Diffractometry (DRX), Polarizing Optical Microscopy (POM), Transmission Electron Microscopy (TEM).

Favorite polymer networks according to the invention are characterized by an enthalpy of melting as measured by DSC superior or equal to 5 J/g, preferably superior or equal to 10 J/g, even more preferably superior or equal to 20 J/g. The detailed method for measuring the enthalpy of melting is the following:

DSC measurements are carried out using a TA Instruments DSC Q1000 operating in the T4 mode. Samples of 5 to 6 mg weight are placed into sealed aluminum capsules. Calibrations of temperature and enthalpy are carried out according to the manufacturer's recommendation by using an indium standard.

Melting enthalpies were determined from thermograms recorded in the second heating at the heating rate of 10° C./minute. Integration of the melting peak is carried out using the Universal Analysis 2000 software in the sig-tangent mode. When special conditions (temperature, pressure, annealings) are necessary for polymer chains to display a semi-crystalline structure, these conditions have to be fulfilled prior to melting enthalpy measurements and in such cases, the melting enthalpy is determined from thermograms recorded in the first heating.

Crystallinity of a polymer can be evaluated in a quantitative manner by differential scanning calorimetry, by density measurements or by X-ray diffraction as described in U. W. Gedde *Polymer Physics* Academic Publishers Dordrecht 1999 as well as in L. H. Sperling *Introduction to Physical Polymer Science* Wiley Interscience New-York 2001. Favorite polymer networks according to the invention are characterized by a crystallinity as measured by one of these three techniques superior or equal to 5 percent, preferably superior or equal to 10%, even more preferably superior or equal to 20%.

Favorite polymer chains are selected from those providing covalently crosslinked polymer network comprising:
semi-crystalline polyester chains
semi-crystalline fluorinated chains
semi-crystalline olefinic chains.

Exchangeable Covalent Bonds L

Polymer networks according to the invention include exchangeable covalent bonds designated L.

Exchangeable covalent bonds are the result of a reaction between a first reactive group A and a second reactive group A'. According to the invention they are the result of, and can take part to, equilibrium reactions. Exchange reactions, according to the invention, are reactions which can be fast enough to alter the properties of the network. In particular the polymer networks according to the invention are able to flow and/or to relax mechanical stress. Notably, polymer networks according to the invention are able to flow and/or to relax mechanical stress when conditioned at a constant temperature $T_1$ close to or higher than the melting point of the network.

Preferably, the time needed to relax 50 percent of an applied stress should be shorter than $10^5$ seconds provided a proper catalyst (promoting bond exchange) is associated to the polymer network and under temperature conditioning.

Exchangeable covalent bonds include in a non limiting manner: —C=C— ethylenic double bonds, —C≡C— acetylenic double bonds, —COO— ester bonds, —CONH— amide bonds, —C=N— imine bonds, —C=N—NH— hydrazone bonds, —C=N—O— oxime bonds, —C(OH)—C(CHO)— aldol bonds, —COO—CH$_2$—C=C— allyl ester bonds, —COS— thioester bonds, —O—C(OR')— acetal and hemiacetal bonds, —Si—O—Si— siloxane bond, —S—O—C— sulphonate and sulphate bonds.

Some bonds are exchangeable in the presence of an appropriate catalyst and are no longer exchangeable in the presence of another catalyst. The exchangeable nature of the bonds is determined by the nature of the catalyst.

For example olefinic double bonds and ester bonds can be present in a same network. Olefinic double bonds are exchangeable when in presence of a metathesis catalyst and not exchangeable when in presence of a transesterification catalyst, to the contrary of ester bonds.

According to the invention these exchangeable covalent bonds L may be either main-chain bonds or crosslinking bonds: In both cases, they are part of the crosslinking system of the polymer network and for this reason are named connecting or crosslinking exchangeable bonds.

Preferably, the number of connecting exchangeable bonds $n_L$ is superior or equal to 15% of the number of crosslinking points $n_C$ in the network, even more preferably superior or equal to 20% of $n_C$. Advantageously, $n_L$ is superior or equal to 30% $n_C$, even better $n_L$ is superior or equal to 50% $n_C$. According to a favorite variant, $n_L$ is superior or equal to 75% $n_C$, and preferably $n_L$ is superior or equal to 90% $n_C$, even more preferably, $n_L$ is superior or equal to 95% $n_C$.

Preferably, in the case of polymer networks wherein the exchange reaction is a metathesis reaction, $n_L$ is superior or equal to 75% $n_C$, and preferably $n_L$ is superior or equal to 90% $n_C$, even more preferably, $n_L$ is superior or equal to 95% $n_C$.

The number of crosslinking points $n_C$ can be calculated directly from the quantity and functionality of crosslinker(s) and/or the crosslinking method used in the formation of the polymer network.

Connectivity:

Above defined monomers and prepolymers should be selected so that connecting exchangeable bonds in the polymer network should represent at least 0.05 molar % of the monomer and prepolymer feed, preferably at least 0.1 molar %, and preferentially at least 1 molar % of the monomer feed. The molar amount of connecting exchangeable bonds $n_L$ can be calculated directly from the quantity of crosslinker(s) and/or the monomers and/or reactants and according to the crosslinking method used in the formation of the polymer network. "Monomer feed" includes all the reactants which will finally be part of the polymer network. It includes monomers, prepolymers, crosslinkers, polyfunctional reactants.

Reactive Groups R

The network according to the invention can include reactive groups R capable of participating in an exchange reaction with at least one exchangeable covalent bond L.

To the difference of exchangeable bonds L, reactive groups R are neither on main-chain bonds or crosslinking bonds, but on pending chains. They are not part of the crosslinking system of the polymer network as long as they have not reacted with an exchangeable bond L.

For example when the polymer network is based on polyolefins and the exchange reaction is olefin metathesis, R represents a double bond —C═C—.

For example when the polymer network is based on triple bonds —C≡C—, R represents a triple bond —C≡C—.

For example when the polymer network is based on amide bonds —CONH—, R represents an amine group —NH or —NH2.

For example when the polymer network is based on imine bonds —C═N—, R represents a primary amine group —NH2 or an aldehyde —CHO.

For example when the polymer network is based on hydrazone bonds —C═N—NH—, R represents a hydrazine NH2-NH— or an aldehyde —CHO.

For example when the polymer network is based on oxime bonds —C═N—O—, R represents an O-aryloxyamine or O-alkyloxyamine.

For example when the polymer network is based on aldol bonds, R represents an aldehyde or a ketone.

For example when the polymer network is based on allyl ester bonds, R represents an alkyl carboxylate.

For example, when the polymer network is based on thioester bonds, R represents a thiol group.

For example, when the polymer network is based on acetal bonds, R represents an alpha or beta diol or aldehyde group.

For example, when the polymer network is based on siloxane bonds, R represents a siloxane group.

For example, when the polymer network is based on thioester bonds, R represents a thiol group.

For example, when the polymer network is based on sulphonate and sulphate bonds, R represents a hydroxy group.

When the polymer network is a polyester and the exchange reaction is transesterification R represents a hydroxy group.

Thus, when the network is submitted to appropriate conditioning, notably the presence of an exchange reaction promoting catalyst and a selected temperature range, exchangeable bonds between polymer chains are exchanged, while keeping the connectivity of the network constant. When reactive groups R are present, they take part to exchange reactions with exchangeable bonds L. The network flows above a temperature $T_1$ which is superior to Tg and which can be superior or equal or inferior to Tf and the material remains insoluble at all temperatures.

The number of moles of available reactive groups R in the network is designated $n_R$.

According to a variant $n_R > 0$

Preferably according to this variant, $n_R \geq 0.01 n_L$

According to a favorite variant, the covalently crosslinked semi-crystalline polymer is a polyester. According to this variant, preferably the reactive group R is an alcohol and $n_R > 0$. Advantageously, according to this variant, $n_R \geq 0.01 n_L$.

Care should be taken to avoid the presence of reactive groups R which, when they react with an exchangeable bond, liberate a molecule capable to escape from the network. For example, when the exchange reaction is transesterification and reactive groups are alcohol functions, care should be taken to avoid the presence of ester groups of a volatile alcohol (ethanol, propanol, butanol . . . ) whose evaporation changes the number of available alcohol functions. If not, the network may lose its properties (combination of insolubility and capability to flow and relax stresses, recyclability and reparability) after several cycles of heating and cooling.

Exchange Reaction Catalyst:

The composition comprises a polymer network as above-disclosed and at least one catalyst capable of promoting the exchange reaction.

Preferably, the exchange reaction catalysts are used in the invention in an amount ranging from 0.5 mol % to 25 mol % relative to the total molar amount of exchangeable bonds L contained in the polymer network, preferably from 1 mol % to 25 mol %, even more preferably from 5 mol % to 25 mol % relative to the total molar amount of exchangeable bonds L contained in the polymer network. This proportion of catalyst is significantly higher than amounts used in the prior art.

When reactive groups R which are capable of taking part to an exchange reaction are present in the polymer network, advantageously, the exchange reaction catalysts can be used in an amount ranging from 0.1 mol % to 25 mol %, preferably from 0.5 mol % to 25 mol %, even more preferably 1 mol % to 25 mol %, even more preferably 5 mol % to 25 mol % relative to the total molar amount of exchangeable bonds L+reactive groups R contained in the polymer network.

According to the invention, the term "exchange reaction catalyst" means a compound that can provide an exchange reaction rate shorter than the experimental time scale at an appropriate temperature. Preferably, the catalyst is selected so that there exists a temperature above which the time needed for the polymer network to relax 50 percent of an applied stress is shorter than $10^5$ seconds. Advantageously, the method to measure stress relaxation is the following:

Stress relaxation measurements are carried using a rheometer operating in the Ø=25 mm parallel plane geometry. In order to ensure the best contact between the sample and the plates the last curing step is performed inside the rheometer as in example 2. The stress is measured as a function of time after a stepwise strain of 1 percent.

Advantageously, a product is considered as being an exchange reaction catalyst for the purposes of the present invention if in a given sample of reactant considered as a model for the exchange reaction, the time for which the exchange ratio reaches 90% is less than 5 hours. An example of such a test will be illustrated here-under in the case of the transesterification reaction. In the case of other exchange reaction, the skilled professional can use analogous proceedings to select appropriate catalysts. In addition, examples of catalysts which can be used in the invention are listed here-under.

When the exchange reaction is a transesterification, advantageously, "transesterification catalyst" means a compound that satisfies the following test:

Catalyst Test:

Preparation of the Ester E1:

6.1 mmol of octanoic acid (Mw=144.2 g/mol, m=0.88 g) and 0.37 mmol (6 mol %) of catalyst C1, 2-methylimidazole (2-MI, Mw=82.1 g/mol, m~30 mg) are placed in a test tube.

At room temperature, the octanoic acid is in liquid form, whereas the 2-MI is a solid that sediments to the bottom of the tube. At 120° C. and with slight manual stirring, the catalyst is rapidly dissolved. 6.1 mmol of benzyl glycidyl ether (Mw=164.2 g/mol, m=1 g) are added and the reaction mixture is stirred in order to homogenise it.

The mixture is heated under a stream of nitrogen (~40 mL/min) at 120° C.

The reaction progress is measured by IR spectroscopy by monitoring the intensity of the $\upsilon_{C=O}$ bands of the ester at 1735 cm$^{-1}$ and of the acid at 1705 cm$^{-1}$ and also $\delta_{C-O-C}$ (ring vibration) of the epoxy at 915 cm$^{-1}$.

After one hour, it is found by this means that the conversion no longer changes. $^{13}$C NMR analysis (CDCl$_3$/TMS) confirms the disappearance of the [COOH] signal at 181 ppm and the appearance of the [COOR] signal at 174 ppm.

The product obtained at the end of this reaction is the ester E1, which is the product of esterification between octanoic acid and benzyl glycidyl ether, which is confirmed by the $^1$H and $^{13}$C NMR analysis.

Preparation of the Ester E2:

The protocol is identical to the preceding. The reaction mixture is then formed from 6.7 mmol of phenyl glycidyl ether (Mw=150.2 g/mol, m=1 g), 6.7 mmol of decanoic acid (Mw=172.3 g/mol, m=1.15 g) and 0.4 mmol of 2-MI (6 mol %, m~33 mg). The decanoic acid and the catalyst C1 are in solid form: the mixture is thus homogenised with gentle stirring at 120° C. The reaction is performed at 120° C. under a stream of 40 mL/min of nitrogen. The reaction progress is monitored in the same manner as previously: the reaction is complete after one hour. This is confirmed by IR and $^{13}$C NMR. The product obtained is the ester E2.

Transesterification Tests:

0.65 mmol of E1, 0.65 mmol of E2 and 0.032 mmol (5 mol %) of catalyst C2, which is the test product, are placed in a test tube. The mixture is homogenised by heating to 150° C. and gently stirring. The reaction mixture is heated to 150° C. using an oil bath under a stream of 40 mL/min of nitrogen.

Samples are taken regularly in order to monitor the transesterification kinetics. Each sample taken is analysed by gas chromatography coupled to mass spectrometry (GC-MS) using a Shimadzu GCMS-QP 2010S machine. The chromatographic analysis is performed with a Shimadzu GC-2010 machine equipped with a Supelco capillary column (model 28041-U) 12 m long, 0.2 mm inside diameter, packed with a film of 0.33 μm of non-polar poly(dimethylsiloxane) stationary phase (Equity™-1 phase). The vector gas is helium, with an inlet pressure of 34.6 kPa, a total flow rate of 44.4 mL/min, a column flow rate of 0.68 mL/min, a linear velocity of 48 cm/s and a purge flow rate of 3 mL/min.

Injection of 1 μL of a solution in methanol of the product to be analysed at a concentration of between 1 mg/g to 5 mg/g is performed at an injection temperature of 250° C. in split mode, with a split ratio of 60%. The column temperature cycle after injection is composed of a plateau at 80° C. for 30 seconds followed by a ramp of 24° C./minute up to 280° C. This temperature is then kept constant for 7 minutes, for a total analysis time of 16 minutes.

The GC chromatograph is coupled to a Shimadzu electron-impact mass spectrometer (EIMS) at 70 eV. The temperature of the ion source and that of the interface are, respectively, 200 and 300° C.

Figure 1:
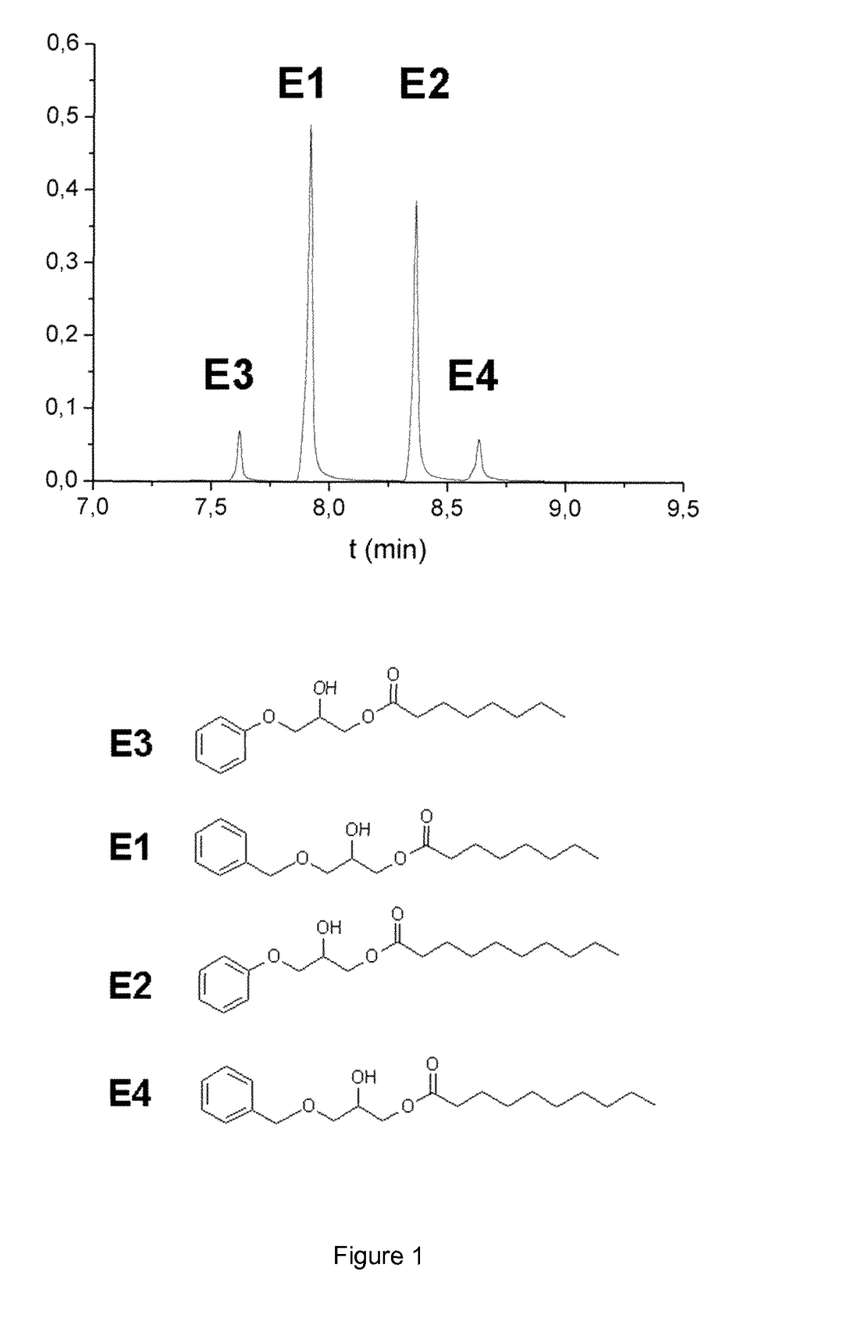
FIG. 1: chromatogram of the products contained in the reaction medium obtained from the transesterification test
Figure 2:
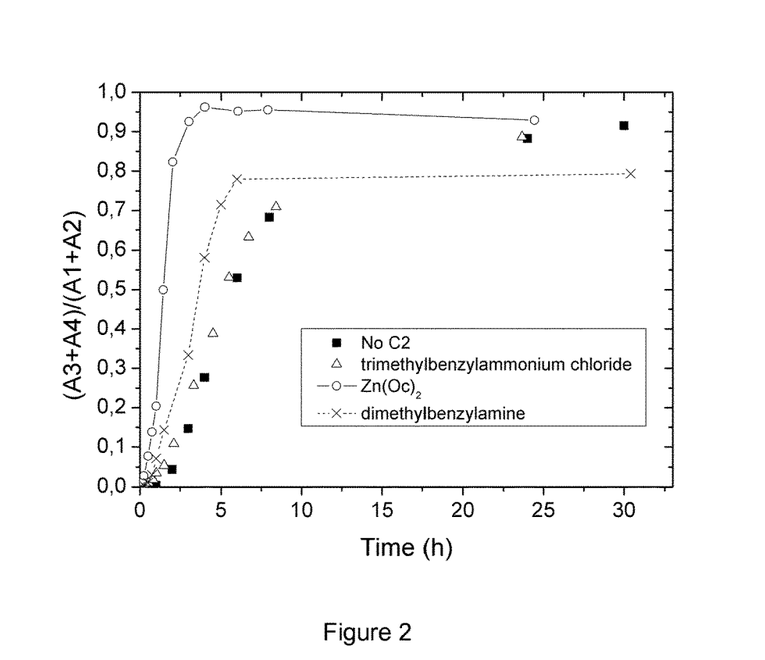
FIG. 2: graphic representation of the transesterification kinetics in the transesterification test

The area of the signals present in the chromatogram of FIG. 1 corresponding to the monoesters E1, E2, E3 and E4, which are exchange products, is measured (these areas are noted A1, A2, A3 and A4, respectively). The monoesters are identified by means of the fragmentation obtained by mass spectrometry. The retention times corresponding to the monoesters E1, E2, E3 and E4 are, respectively, 7.9, 8.4, 7.6 and 8.6 min. The kinetics are obtained by plotting the ratio of the areas (A3+A4)/(A1+A2) as a function of the sampling time, and illustrated in FIG. 2.

A product is considered as being a transesterification catalyst for the purposes of the present invention if the time for which the ratio reaches 0.9 is less than 5 hours.

The catalyst may be selected from:

Catalysts of organic nature, such as: guanidines, such as triazabicyclodecene amidines (TBD), pyridines such as 4-pyrrolidinopyridine, dimethylaminopyridine;

Metal salts, rare earth salts, alkali metal and alkaline earth, including:

salts of Zn, Sn, Mg, Co, Ca, Ti and Zr as acetylacetonates especially cobalt acetylacetonate, samarium acetylacetonate;

tin compounds such as dibutyltinlaurate, tin octoate, dibutyltin oxide, dioctyltin, dibutyldimethoxytin, tetraphenyltin, tetrabutyl-1,3-dichlorodistannoxane and all other stannoxanes;

rare earth salts of alkali metals and alkaline earth metals, particularly rare earth acetates, alkali metal and alkaline earth metal such as calcium acetate, zinc acetate, tin acetate, cobalt acetate, nickel acetate, lead acetate, lithium acetate, manganese acetate, sodium acetate, cerium acetate;

salts of saturated or unsaturated fatty acid and metal, and alkali metal, alkaline earth and rare earth, such as zinc stearate;

Metal oxides such as zinc oxide, antimony oxide, indium oxide;

Metal alkoxides such as titanium tetrabutoxide, titanium propoxide, titanium isopropoxide, titanium ethoxide, zirconium alkoxides, niobium alkoxides, tantalum alkoxides;

Alkali metal, alkaline earth metal and rare earth alcoholates and metal hydroxides, such as sodium alcoholate, such as sodium methoxide, potassium alkoxide, lithium alkoxide;

Sulfonic acids including: sulfuric acid, methane sulfonic acid, paratoluene sulfonic acid;

Phosphines including: triphenylphosphine, dimethylphenylphosphine, methyldiphenylphosphine, triterbutylphosphine;

Phosphazenes.

In the above mentioned list all catalysts are appropriate to catalyze a transesterification reaction, including thioester transesterification reactions.

Advantageously, the catalyst is selected from those having an exchange reaction kinetics similar to that of the metal salts of zinc, tin, magnesium, cobalt, calcium, titanium and zirconium, particularly acetylacetonates of said metals, when used in a transesterification reaction.

In the case of a metathesis exchange reaction, the favorite catalysts are Ru (Grubbs) catalysts.

Table 1 here-under illustrates combinations of selected favorite exchangeable bonds, reactive groups and catalysts.

TABLE 1

| Favorite exchangeable bond L | Favorite reactive groups R | Favorite Catalysts |
|---|---|---|
| —C=C— ethylenic double bonds | alkene $R_3$—HC=CH—$R_2$ | Grubbs catalyst |
| —C≡C— acetylenic double bonds | alkyne $R_3$—C≡C—$R_2$ | Mo based catalyst |
| —COO— ester bonds | hydroxy HO—$R_2$ | See list above |
| —CONH— amide bonds | amine $R_3$—NH—$R_2$ | protease or metallic catalyst |
| —C=N— imine bonds | primary amine $H_2N$—$R_2$ or aldehyde OHC—$R_2$ | acid |
| —C=N—NH— hydrazone bonds | substituted hydrazine $H_2N$—NH—$R_2$ or aldehyde OHC—$R_2$ | acid |
| —C=N—O— oxime bonds | O-aryloxyamines or O-alkyloxyamines | acid |
| —C(OH)—C(CHO)— aldol bonds | aldehyde OHC—$R_2$ or ketone $R_3$—C(O)—$R_2$ | acid |
| —COO—$CH_2$—C=C— allyl ester bonds | alkyl carboxylate $R_2$—COO$^-$ | Palladium (0) catalyst |
| —COS— thioester bonds | thiol HS—$R_2$ | cf esters |
| —O—C(OR') acetal and hemiacetal bonds | α or β diol or aldehyde | acid |
| —Si—O—Si— siloxane bond | —Si—O—Si— | tetramethyl ammonium ion preferably introduced in the form of bis(tetramethylammonium) oligodimethylsiloxanediolate |
| —S—O—C— sulphonate and sulphate bonds. | hydroxy HO—$R_2$ | cf esters |

These catalysts are generally in solid form and in this case, advantageously in the form of a finely divided powder.

One can use a heterogeneous catalyst, that is to say, a catalyst which is not in the same phase as the reactants, but advantageously one uses a homogeneous catalyst, present in the same phase as the reactants.

Preferably, the catalyst is dissolved in the monomer mixture, or in the precursor polymer or in the crosslinker The catalyst, solid or liquid, is preferably soluble in the monomer mixture, or in the precursor polymer.

In the case of a transesterification reaction, preferably, the catalyst is chosen from metal salts, and more specifically from salts of zinc, tin, magnesium, cobalt, calcium, titanium and zirconium.

Preferably, in the case of polymer networks wherein the exchange reaction is a transesterification, the transesterification catalyst is used in total molar amount between 5% and 25% of the total molar amount of exchangeable bonds L+reactive groups R in the polymer network.

In the case of a metathesis reaction, preferably, the catalyst is chosen from Ru catalysts, preferably it is selected from Grubbs catalyst and Hoveyda-Grubbs catalyst.

When preparing the composition of the invention, one can start from the polymer network which has been above described and introduce a catalyst into that polymer network.

According to a variant, the composition is directly prepared from the reactants.

The reactants can be monomer compositions, polymer precursors, crosslinkers.

According to this variant, preferably, the catalyst, solid or liquid, is solubilized in one of the components of the reaction. The catalyst can be solubilized in the precursor polymer and then the catalyst/precursor mixture is put into contact with the crosslinker. Or the catalyst is solubilized in the crosslinker, in some cases it can react with the crosslinker, and then the catalyst/crosslinker mixture is put into contact with the precursor polymer. Or the catalyst is solubilized in the monomer composition including the crosslinker.

Compositions of polymer network comprising at least one polymer network whose composition and characteristics have been described above may further comprise: one or more polymers, pigments, dyes, fillers, plasticizers, fibres, flame retardants, antioxidants, lubricants, wood, glass, metals.

Among the polymers that may be used mixed with the polymer networks of the invention, mention may be made of: elastomers, thermosets, thermoplastic elastomers, impact additives.

The term "pigments" means coloured particles that are insoluble in the polymer network. As pigments that may be used in the invention, mention may be made of titanium oxide, carbon black, carbon nanotubes, metal particles, silica, metal oxides, metal sulfides or any other mineral pigment; mention may also be made of phthalocyanins, anthraquinones, quinacridones, dioxazines, azo pigments or any other organic pigment, natural pigments (madder, indigo, crimson, cochineal, etc.) and mixtures of pigments. The pigments may represent from 0.05% to 75% by weight relative to the weight of the material.

The term "dyes" means molecules that are soluble in the polymer network and that have the capacity of absorbing part of the visible radiation.

Among the fillers that may be used in the polymer network composition of the invention, mention may be made of: silica, clays, calcium carbonate, carbon black, kaolin, whiskers.

The presence in the polymer network compositions of the invention of fibres such as glass fibres, carbon fibres, polyester fibres, polyamide fibres, aramid fibres, cellulose and nanocellulose fibres or plant fibres (linseed, hemp, sisal, bamboo, etc.) may also be envisaged.

The presence in the polymer network composition of pigments, dyes or fibres capable of absorbing radiation may be used to ensure the heating of an article based on such a polymer network composition by means of a radiation source such as a laser. The presence in the polymer network composition of pigments, fibres or electrically conductive fillers such as carbon black, carbon nanotubes, carbon fibres, metal powders or magnetic particles may be used to ensure the heating of an article based on such a polymer network composition by the Joule effect, by induction or by microwaves. Such heating may allow the use of a process for manufacturing, transforming or recycling an article made of polymer network according to a process that is described below. Such electroconductive charges may also ensure that electrostatic charges are evacuated from the material. They can additionally be used to permit electrostatic painting.

The invention is also related to objects or articles resulting from processing a composition as above disclosed. Such a processing generally includes a curing step, which is performed at an adapted temperature according to the nature of the polymer chains, so that the gel point is reached or exceeded.

Favorite Embodiment

According to a favorite embodiment, the covalently crosslinked polymer network composition comprises:
A covalently crosslinked polymer network comprising:
crosslinking ester bonds,
semi-crystalline olefinic chains, and
preferably hydroxyl groups, which are capable of participating in an exchange reaction with at least one ester bond,
A transesterification catalyst.

When the polymer network comprises pending ester groups, preferably the number of hydroxyl functions should be superior to the number of pending ester groups. Such a condition is satisfied thanks to a proper selection of polymer precursors.

Polymer networks according to this favorite embodiment of the invention comprise hydrocarbon chains comprising C=C double bonds, connecting ester bridges, OH groups. They can comprise epoxy groups; beta-hydroxyester; ether bridges; this list being non-limitative. Preferably, the total weight of hydrocarbon chains, connecting ester bridges, OH groups represents at least 40% by weight of the weight of the polymer network, advantageously at least 80%, better at least 90%, and even better at least 95% by weight of the weight of the polymer network. These % relate to the polymer network itself and do not take into accounts additives such as pigments, dyes, fillers, impact modifiers, plasticizers, fibers, flame retardants, antioxidants, lubricants, wood, glass, metals.

According to one favorite embodiment, polymer networks according to the invention consist essentially in hydrocarbon chains including C=C double bonds, connecting ester bridges, OH groups.

A subject of the invention is also a process for manufacturing an article based on a polymer network composition as described above, this process comprising:
a) the preparation of the polymer network composition by mixing the components in a one-step or sequential manner,
b) the forming of the composition obtained from step a),
c) the application of energy for hardening the polymer network composition,
d) cooling of the hardened polymer network composition.

The placing in contact of the components may take place in a mixer of any type known to those skilled in the art. The application of energy for hardening the polymer network composition in step c) of the process may consist, in a known manner, of heating at a temperature of from 50 to 250° C. The cooling of the hardened polymer network composition is usually performed by leaving the material to return to room temperature, with or without use of a cooling means.

The process is advantageously performed in conditions such that the gel point is reached or exceeded at the end of step d). Especially, the process according to the invention advantageously includes the application of sufficient energy at step c) for the gel point of the polymer network to be reached or exceeded. Even more avantageously in conditions such that the gel point is not reached at the end of step a) but reached at the end of step c).

For the purposes of the present invention, the term "article" means a component based on a material comprising a crystalline or semi-crystalline crosslinked polymer network composition including exchangeable bonds and a catalyst promoting bond exchange reactions as described above. It may be an article made of a composite material. It may especially be envisaged to introduce before, during or after step a) one or more additional components that may be chosen especially from polymers, pigments, dyes, fillers, plasticizers, fibres, flame retardants, antioxidants, lubricants, wood, glass and metals. The article may have pores, which are open or closed and filled with gas. Advantageously, in the articles according to the invention, the gel point of the polymer network is reached or exceeded.

The articles according to the invention may also consist of coatings that are deposited on a support, for instance a protective layer or a paint. They may also consist of an adhesive material.

According to a favourite variant wherein the polymer is a polyester and the exchange reaction is a transesterification reaction, in practice, the catalyst is first dissolved in the composition comprising the crosslinker, generally by heating with stirring, and the two compositions are then mixed together.

An article resulting from the forming and hardening of the polymer network composition described above also forms part of the invention.

In particular, the invention relates to an article or material, based on semi-crystalline covalently crosslinked polymer network composition with exchangeable bonds that may be obtained via the process described above. Notably, it relates to an article or material, based on semi-crystalline covalently crosslinked polymer network composition with exchangeable bonds, this composition having reached or exceeded its gel point.

The term "application of energy for hardening the polymer network composition" generally means raising the temperature.

Usually, an article based on a covalently crosslinked polymer network composition is manufactured by mixing one or several of the following components: monomers or polymer precursor, crosslinker, catalyst and additives, introduction in a mould and raising the temperature. The means for manufacturing such an article are well known to those skilled in the art.

However, by means of the covalently crosslinked polymer network compositions of the invention, other methods for forming the article than moulding may be envisaged, such as filament winding, continuous moulding or film-insert moulding, infusion, pultrusion, RTM (resin transfer moulding), RIM (reaction-injection moulding) or any other method known to those skilled in the art, as described in the publications "Epoxy Polymer", edited by J. P. Pascault and R. J. J. Williams, Wiley-VCH, Weinheim 2010 or "Chimie industrielle", by R. Perrin and J. P. Scharff, Dunod, Paris 1999.

The materials based on crosslinked polymer network compositions according to the invention, on account of their particular composition, can be transformed, repaired and recycled by raising the temperature of the article.

They also have the advantage that their viscosity can be controlled even in the melted state so that they can be transformed by using other technical means than molding.

One particular case of an article of the invention consists of a material resulting from the hardening of a covalently crosslinked polymer network composition of the invention. The mechanical properties of such materials are characterized below and illustrate the innovative nature of the invention. These properties are conserved even after transformation of these materials by a process as described above (application of a mechanical constraint and temperature elevation).

Below the glass transition temperature Tg, the polymer is vitreous and has the behaviour of a rigid solid with an elastic storage modulus of between $10^8$ and $10^{10}$ Pa.

Above the Tg temperature and below $T_1$, it has viscoelastic behaviour over a broad temperature range, with a storage modulus at 1 Hz of between $1\times10^5$ and $5\times10^8$ Pa according to the composition. Around the melting temperature Tf, there is a drop of the elastic storage modulus at 1 Hz. The drop is more pronounced when the degree of crystallinity is high.

When $T_1$ occurs close to Tf, the system, in comparison to crosslinked semicrystalline polymers of the prior art, shows better solvent resistance and good processability above Tf.

When $T_1$ occurs well above Tf, the system shows, in comparison to its non-crosslinked counterpart, better solvent resistance, better creep resistance due to viscosity higher than $10^{11}$ Pa·s between Tf and $T_1$ and good processability above $T_1$. Above $T_1$, the system exhibits a slow variation of viscosity with temperature. This makes the behaviour of the material comparable to that of inorganic glasses and allows thermoplastics transformation processes to be applied thereto on a larger temperature scale and with a better control of viscosity value.

From a practical point of view, this means that, within a broad temperature range, the article can be deformed with improved viscosity control. In particular, they can be thermoformed.

The exchange reactions are the cause of the relaxation of constraints and of the variation in viscosity at high temperatures. In terms of application, these materials can be processed at high temperatures, where a low viscosity allows injection or moulding in a press. It should be noted that, contrary to Diels-Alder reactions, no depolymerisation is observed at high temperatures and the material maintains its covalently crosslinked structure. In all cases, the polymer's processability is improved: The polymer networks can have more flexible and controlled modes of transformation thanks to a better control of the viscosity and plasticity of the network.

Contrarily to the methods of connecting and disconnecting networks based on Diels-Alder or similar reactions, the invention relates to a method of crosslinking semi-crystalline polymers, wherein the polymer network remains beyond the gel point, even in the presence of a catalyst and under application of heat.

Contrarily to the methods of transforming of memory-reshaped polymer, the invention relates to a method of transforming crosslinked semi-crystalline polymers, whereinthe polymer network can be submitted to a strain at a set temperature and relaxed at the same temperature and not in a temperature cycling process. In comparison to crosslinked semicrystalline polymer compositions of the prior art, polymer network compositions according to the invention also, surprisingly, present at equivalent degree of crystallinity, decreased thermal expansion coefficient between Tg and Tf. They also present improved chemical properties: increased solvent resistance, and at equivalent degree of crystallinity, increased impermeability to gases and liquids. This property allows the repair of two parts of an article. No mould is necessary to maintain the shape of the components during the repair process at high temperatures. Similarly, components can be transformed by application of a mechanical constraint to only one part of an article without the need for a mould, since the material does not flow under its own weight. However, large-sized components, which have more of a tendency to collapse, can be maintained by a support frame, as in the case of glassworking.

Another subject of the invention is thus a process for transforming at least one article made from a material as described above, this process comprising: the application to the article of a mechanical constraint at a temperature (T) above room temperature.

Preferably, in order to enable transformation within a time that is compatible with industrial application of the process, the process comprises the application to the article of a mechanical constraint at a temperature (T) superior or equal to the glass transition temperature Tg of the material of which the article is composed.

According to one favourite variant, the process comprises the application to the article of a mechanical constraint at a temperature (T) superior or equal to the temperature $T_1$ of the material of which the article is composed.

Usually, such a process is followed by a step of cooling to room temperature, optionally with application of at least one mechanical constraint.

For the purposes of the present invention, the term "mechanical constraint" means the application of a mechanical force, locally or to all or part of the article, this mechanical force tending towards forming or deforming the article.

Among mechanical constraints that may be used, mention may be made of: pressure, moulding, blending, extrusion, blow-moulding, injection-moulding, stamping, twisting, flexing, pulling and shearing.

It may be, for example, twisting applied to a strip of material of the invention. It may be a pressure applied by means of a plate or a mould onto one or more faces of an article of the invention, stamping a pattern in a plate or sheet made of material of the invention. It may also be a pressure exerted in parallel onto two articles made of materials of the invention in contact with each other so as to bring about bonding of these articles. In the case where the article consists of granules of material of the invention, the mechanical constraint may consist of blending, for example in a blender or around an extruder screw. It may also consist of injection-moulding or extrusion. The mechanical constraint may also consist of blow-moulding, which may be applied, for example, to a sheet of material of the invention. The mechanical constraint may also consist of a plurality of separate constraints, of identical or different nature, applied simultaneously or successively to all or part of the article or in a very localised manner.

This transformation may include mixing or agglomeration with one or more additional components chosen from: one or more polymers, pigments, dyes, fillers, plasticizers, fibres, flame retardants, antioxidants, lubricants, wood, glass or metals.

Assembling, bonding and repair are particular cases of the transformation process described above.

This raising of the temperature of the article may be performed by any known means such as heating by conduction, convection, induction, spot heating, infrared, microwave or radiant heating. The means for bringing about an increase in temperature of the article in order to perform processing of the article comprise: an oven, a microwave oven, a heating resistance, a flame, an exothermic chemical reaction, a laser beam, a hot iron, a hot-air gun, an ultrasonication tank, a heating punch, etc.

The temperature increase may or may not be brought about in stages, and its duration is adapted to the expected result as a function of the indications that will be given and of the examples detailed below.

The process of the invention is based on exchange reactions that are promoted by the presence of a catalyst by exchangeable bonds L, and possibly by available reactive functions R within the polymer network in the materials of the invention.

Thanks to exchange reactions the material does not flow during the transformation, by selecting an appropriate temperature, heating time and cooling conditions, the new shape may be free of any residual constraint. The material is thus not embrittled or fractured by the application of the mechanical constraint. Furthermore, the component will not return to its first shape. Specifically, the exchange reactions that take place at high temperature promote a reorganisation of the polymer network so as to cancel out mechanical constraints. A sufficient heating time makes it possible to completely cancel these mechanical constraints internal to the material that have been caused by the application of the external mechanical constraint.

According to one variant, a subject of the invention is a process for obtaining and/or repairing an article based on a semi-crystalline covalently crosslinked polymer network composition, comprising:
  at least one step (a) of curing a semi-crystalline covalently crosslinked polymer network composition to form an article,
  a step (b) of placing at least two articles as obtained in step (a) in contact, and
  a step (c) of applying a temperature (T) above room temperature so as to obtain a single article.

For the purposes of the present invention, the term "article" especially means a component made of semi-crystalline covalently crosslinked polymer network composition material; in particular a composite material, a foam, a film or a stack of films or sheets.

For the purposes of the present invention, the term "damage" means a scratch, a surface or deep crack that may lead to complete rupture of the article along one of its dimensions or any other defect microscopically induced in the course of stresses on or ageing of the article.

According to the invention, the temperature (T) during step (b) is chosen within the range from 50° C. to 250° C. and preferably from 100° C. to 200° C.

An article made of material of the invention may also be recycled: either via direct treatment of the article: for example, the broken or damaged article is repaired by means of a transformation process as described above and may thus regain its prior working function or another function; or the article is reduced to particles by application of mechanical grinding, and the particles thus obtained may then be used in a process for manufacturing an article. In particular, according to this process, particles of material of the invention are simultaneously subjected to a rising of temperature and a mechanical constraint allowing them to be transformed into an article, while controlling the viscosity of the composition.

The mechanical constraint that allows the transformation of particles into an article may, for example, comprise compression in a mould, blending or extrusion.

This method thus makes it possible, by applying a sufficient temperature and an appropriate mechanical constraint, to mould articles from the crystalline or semi-crystalline covalently crosslinked polymer network composition material, while controlling the viscosity of the material. Especially, it makes it possible to mould articles from the material based on semi-crystalline covalently crosslinked polymer network composition having reached or exceeded the gel point.

Another advantage of the invention is that it allows the manufacture of materials made of semi-crystalline covalently crosslinked polymer network compositions, in the form of elemental components or units based on semi-crystalline covalently crosslinked polymer network compositions having reached or exceeded the gel point: particles, granules, beads, rods, plates, sheets, films, strips, stems, tubes, etc. via any process known to those skilled in the art. These elemental components may then be transformed under the combined action of heat and of a mechanical constraint into articles of the desired shape, while controlling the viscosity of the composition: for example, strips may, by stamping, be chopped into smaller pieces of chosen shape, sheets may be superposed and assembled by compression.

A subject of the invention is thus a process for manufacturing at least one article based on semi-crystalline polymer compositions, which is a particular case of the transformation process already described, this process comprising:
  a) the use as starting material of a material or article of the invention in the form of an elemental unit or an assembly of elemental units,
  b) the simultaneous application of a mechanical constraint and a conditioning of the article at a temperature T to form the article,
  c) cooling of the article resulting from step b).

Especially at step a), the material or article of the invention is advantageously based on semi-crystalline covalently crosslinked polymer network compositions having reached or exceeded the gel point.

After use, articles can be reconditioned in the form of elemental units or components and then reformed again according to the invention.

One subject of the invention is thus a process for recycling an article made of material of the invention, this process comprising:
  a) the use of the article as starting material,
  b) the application of a mechanical constraint, and optionally of a simultaneous increase of temperature, to transform this article into an assembly of elemental units,
  c) cooling of this assembly of elemental units.

Especially at step a), the article is advantageously based on semi-crystalline covalently crosslinked polymer network compositions having reached or exceeded the gel point The term "elemental units" means components that have a standardised shape and/or appearance that are suited to their subsequent transformation into an article, for instance: particles, granules, beads, rods, plates, sheets, films, strips, stems, tubes, etc. The term "assembly of elemental units" means at least two elemental units, better still at least three, even better still at least 5, preferentially at least 10, even more preferentially at least 100, advantageously at least $10^3$, even more advantageously at least $10^4$ and preferentially at least $10^5$.

One significant advantage of the semi-crystalline covalently crosslinked polymer network compositions according to the invention, as compared to prior art compositions that are not based on exchangeable bonds is that their two characteristic temperatures (Tg, and Tf) and their behaviour around or above $T_1$ permit fine tuning of the composition's viscosity. And these characteristic temperatures can be adapted to selected values by the selection of appropriate monomers and/or polymer precursors, crosslinkers and catalysts.

The materials and processes of the invention make it possible to overcome the drawbacks of prior art materials, which are the excessive fluidity of articles based on semi-crystalline covalently crosslinked polymer network compositions, when these compositions have reached or exceeded their melting point. They especially make it possible to transform and recycle in a convenient manner, with a fine tuned control of viscosity, articles based on such compositions. The process also makes it possible to manufacture semi-crystalline covalently crosslinked polymer network compositions which have superior mechanical resistance and thermal resistance as compared to prior art semi-crystalline covalently crosslinked polymer network compositions. They also have improved resistance to chemicals in general and solvents in particular.

The fields of application of these materials are all those of thermoplastic polymer compositions: materials and composites for motor vehicles, for aeronautical construction, electronics, sport, construction, printing and packaging, articles for the storing or the distribution of chemicals, like solvents or fuel, for example sheath used for the manufacture of fuel distribution pipes.

The compositions that are the subject of the invention are advantageously intended to be applied to a metal support, in the form of a varnish, a paint, an anticorrosion protective coat or a protective coat on an electronic circuit. It may also be used as a seal or a layer of glue or adhesive.

The invention has been described with reference to preferred embodiments. However, many variations are possible within the scope of the invention.

EXPERIMENTAL PART

Example 1

Preparation A: Solubilization of the Catalyst and Ligand Exchange

In a 100 mL round bottom flask, 20 g of Pripol® 1009 [molar mass: 285 g per mol of COOH functions, weight percentages of dimer: 99 wt %, monomer: 1 wt % and 1.54 g of zinc acetate dihydrate (7 mmol, corresponding to a molar ratio [Zn]/[COOH] of 0.10) were placed. The mixture was heated under vacuum, step by step from 110° C. to 180° C. for 3 hours until complete dissolution of the catalyst. A strong gas evolution was observed, which confirms the elimination of acetate ligands, replaced by fatty acids carboxylates. The obtained substance is called sample A.

Preparation B: Polymer Modification by Reactive Blending in a Micro-Compounder 1.7 g of sample A [calculated molar mass: 291.4 g per acyl group] are applied using a spatula onto the screws of a DSM micro 15 microcompounder. The flask containing sample A and the spatula used for enduction are weighed before and after coating to determine the above exact mass introduced into the extruder and calculate the other quantities accordingly. The extruder body is then closed and heated to 120° C., the lower valve positioned in recirculation mode and the rotation speed set at 60 rpm. Once the temperature is stabilized, 11.24 g [5.9 mmol of epoxy functions] of a sample of poly(ethylene-co-glycidyle methacrylate containing 7.41 wt % glycidyle methacrylate units are added. The mixture is then stirred in recirculation mode for 10 minutes and collected in the form of an extruded rod. The rod, which is transparent at the exit of the extruder becomes rapidly hard and translucent on cooling. It is allowed to rest for 30 minutes before cutting it into 5 to 10 mm long fragments. The obtained granulate is called sample B.

Preparation C 6.4 g of sample B are placed in a mold consisting of a 1.5 mm thick parallelepipedic brass plate perforated by a rectangular window 95×30 mm and placed between two 1.5 mm thick brass plates separated by sheets of anti-adhesives paper. The assembly is placed in a heating press preheated to 130° C. Curing is continued at 130° C. for 20 h. The obtained film, which will be referred to below as sample C is removed from the mold. IR-spectroscopy analyses, in comparison with those of the starting materials, show the disappearance of the signals characteristic of the epoxy functions (914 cm$^{-1}$) and carboxylic acid (1705 cm$^{-1}$) and the appearance of those carboxylic acid functional groups at 1735 cm$^{-1}$ and a broad band at 3300 cm$^{-1}$ due to the presence of hydroxyl functions.

Example 2

Preparation D

In this example, the curing is carried out in situ in the cell of an Anton Parr MCR 1501 rheometer operating in the parallel planes geometry. 1.7 g of sample B are placed on the lower plate of a disposable Ø=25 mm cell preheated to 130° C. The upper plate is lowered at such a rate that the normal force does not exceed 10 N until a value of 1 mm gap. The excess material is carefully removed with a spatula.

Cure monitoring is performed by oscillatory rheological measurements of amplitude 0.5% and pulsation 1 rad/s. After a few minutes, it is evident that the elastic modulus G' increases and becomes rapidly larger than the viscous modulus, G". After 20 hours of curing at 130° C., G' is about 100 times higher than G" and there is no more significant evolution. The sample is called sample D.

Comparative Example 3

Preparation E

A film is prepared in the same way as in Example 1 (Preparation C) but using non-grafted poly(ethylene-co-glycidyle methacrylate) (containing 7.41 wt % glycidyle methacrylate units) and without long cure cycle. The film is just pressed at 120° C. for 2 minutes, then removed from the press and collected after cooling. In the following, this sample is designated sample E.

Example 4

Preparation F

In this example, mixing is carried out in a standard way using a 140° C. preheated DSM micro 15 microcompounder: 12 g (about 7 mmol epoxy) of Lotader 8840 (Glycidyle methacrylate content: 0.08 wt %) are introduced in the extruder, together with 0.78 g (about 7 mmol COOH) of dodecanedioic acid and 94 mg (0.7 mmol) of TBD. The mixture is malaxed at 60 rpm for 2 minutes at 140° C. The extruded strand is transparent at the exit of the die and becomes white upon cooling. Curing is then performed in a brass mold using a heating press as in preparation C but at 150° C. for one hour. After cooling a translucent film called sample F is obtained.

Results

Solubility Tests

Disk-shape specimens are punched out of the previous samples with the help of a circular punch of 11 mm diameter. One sample according to the invention (Example 1, Preparation C) and one sample according to the prior art (example 3, preparation E) are placed in two tubes each containing 18 mL of 1,2,4-trichlorobenzene. The tubes are heated to 120° C. using an oil bath. After 20 hours at 120° C., the sample according to the prior art is completely dissolved, whereas the sample according to the invention is swollen but not dissolved. In the case of sample F, solubility tests are performed before and after stress relaxation experiments (see below) on 100 µm thick specimens cut out from the film with the help of a microtome. Swelling is performed at 120° C. in tubes containing 10 mL of 1,2,4-trichlorobenzene. After 20 h, it is evident that sample F is swollen but not dissolved. The linear dimensions (length, width) of the specimens show in average an increase of 25% for sample F before the stress relaxation experiment and of 16% after the stress relaxation experiment.

Measures of Stress Relaxation:

The measure of viscosity is performed by stress relaxation experiments using a rheometer operating in the Ø=25 mm parallel planes geometry. Preferably the sample for stress relaxation experiments are prepared by curing a liquid reactive mixture inside the rheometer in order to insure a good mechanical contact between the parallel plates and the sample.

When it is not possible to prepare the sample for stress relaxation experiments inside the rheometer, for instance when strong gas evolutions occur or when the material is not obtained in its final form by heating a reactive liquid, disk-like specimens have to be prepared ex situ and adjusted inside the rheometer prior to stress relaxation experiments. In this case, the skilled professional knows how to check that there is actually a good mechanical contact between the sample and the parallel plates, for instance, by performing stress relaxation experiments at different values of strain or by performing rheological measurements in the oscillatory mode prior to stress relaxation experiments. The temperature of sample D made in situ in the rheometer is set at 250° C. After 20 minutes of equilibration (with a constant normal force applied of 0.1N to follow the thermal dilatation), a stress relaxation test is performed as follows: a static strain of 1% ($\gamma=0.01$) is applied. In the following table are reported the stress values measured versus time. In the case of sample F, a disk of Ø=25 mm is cut with the help of a circular punch and put into a rheometer, prealably heated to the desired temperature (200° C.). The interplane distance is adjusted in order to reach a normal force of about 25 N. After 5 minutes equilibration at 200° C., a frequency sweep is recorded, showing a nearly constant value of G' of about 0.86 MPa within the whole frequency range (from 0.6 s$^{-1}$ to 100 s$^{-1}$). The duration of the frequency sweep experiment at 200° C. is about 15 minutes. After that, a 1% shear strain is applied and stress relaxation measurements are performed.

TABLE 2

| Sample D, 250° C. | | Sample F, 200° C. | |
|---|---|---|---|
| Time (s) | Stress (Pa) | Time (s) | Stress (Pa) |
| 1 | 11463 | 1 | 8647 |
| 2045 | 10304 | 15 | 7592 |
| 4429 | 9124 | 50 | 6985 |
| 6844 | 7930 | 200 | 5983 |
| 10821 | 6770 | 455 | 4312 |
| 19586 | 5672 | 1000 | 2777 |
| 36767 | 4481 | 2000 | 1783 |
| 61229 | 3348 | 4003 | 1338 |
| 103571 | 2197 | 6988 | 797 |
| 137894 | 1014 | 9956 | 621 |
| 167176 | 537 | 20000 | 368 |
| 194409 | 181 | 50000 | 68 |

The viscosity $\eta$, expressed in Pa·s, is determined by using the formula:

$$\eta = \sigma_0 \times \tau_{0.5}/\gamma$$

where $\gamma$, a dimensionless number is the value of the applied strain.

$\sigma_0$, expressed in pascals (Pa), is the value of stress measured within 1 second after application of the strain.

$\tau_{0.5}$, expressed in seconds (s) is a value of time, measured from the instant when the distortion has been applied for which the value of stress is equal to 50% (±2%) the value of the initial stress $\sigma_0$.

Using the values of the above table, the values of viscosity thereby found are:

Sample D 250° C.: $\eta=2.3 \; 10^{10}$ Pa·s

Sample F 200° C.: $\eta=4.7 \; 10^{8}$ Pa·s

Enthalpy of Melting

DSC measurements are carried out using a TA Instruments DSC Q1000 operating in the T4 mode. Samples of 5 to 6 mg weight are placed into sealed aluminum capsules. Calibrations of temperature and enthalpy are carried out according to the manufacturer's recommendation by using an indium standard.

Melting enthalpies were determined from thermograms recorded in the second heating at the heating rate of 10° C./minute. Integration of the melting peak is carried out using the Universal Analysis 2000 software in the sig-tangent mode.

Thermal Analysis

The films of Examples 2, 3 and 4 (samples C, E and F) were analyzed by DSC and DMA. The following results were obtained.

TABLE 3

| | | Tg (° C.) | ΔCp (J/g/K) | Tm (° C.) | ΔHm (J/g) | E' (20° C.) MPa | E' (150° C.) MPa |
|---|---|---|---|---|---|---|---|
| Sample C | DSC | −16.3 | 0.3 | 103.27 | 36.16 | | |
| | DMA | −0.42 | | | | 143.5 | 0.67 |
| Sample E | DSC | −24 | 0.15 | 105.13 | 55.3 | | |
| | DMA | −12.5 | | | | 237.1 | N.A. |
| Sample F | DSC | −8 | 0.35 | 92 | 50.6 | | |

The invention claimed is:

1. Polymer network composition comprising:
a semi-crystalline covalently crosslinked polymer network comprising polymeric crystallizable fragments selected from polyolefins, polyesters, thermostable aromatics, or mixtures thereof and further including exchangeable covalent bonds designated L, being either main-chain bonds or crosslinking bonds and pending chains comprising reactive group R, wherein the number of exchangeable covalent bonds L, $n_L$, is superior or equal to 15% of the number of crosslinking points, $n_C$, in the network the number of reactive group R, $n_R$, is superior or equal to 1% of the number of exchangeable covalent bonds $n_L$,
exchangeable covalent bonds L are ester bonds and reactive groups R are hydroxyl groups, said pending chains comprising reactive group R are capable participating in an exchange reaction with at least one ester bond and the exchange reaction does not liberate a volatile alcohol, the number of hydroxyl functions is superior to the number of pending ester groups and wherein the polymer network comprises beta-hydroxy-ester bridges; and
a transesterification catalyst.

2. Polymer network composition according to claim 1, wherein it further comprises at least one additive selected from the group consisting of: polymers, pigments, dyes, fillers, plasticizers, fibres, flame retardants, antioxidants, lubricants, wood, glass, and metals.

3. Polymer network composition according to claim 1, wherein exchange reaction catalysts are present in an amount ranging from 0.1 mol % to 25 mol % relative to the total molar amount of exchangeable bonds L contained in the polymer network.

4. Polymer network composition according to claim 1, wherein the catalyst is selected from the group consisting of:
catalysts of organic nature,
Metal salts, rare earth salts, alkali metal salts and alkaline earth metal salts,
Metal oxides,
Metal alkoxides,
Alkali metal, alkaline earth metal and rare earth alcoholates and metal hydroxides,
Sulfonic acids,
Phosphines, and
Phosphazenes.

5. Polymer network composition according to claim 4, wherein the catalyst is selected from the group consisting of:
salts of Zn, Sn, Mg, Co, Ca, Ti, Zr,
tin compounds,
rare earth salts, alkali metals salts and alkaline earth metals salts, and
salts of saturated or unsaturated fatty acid and metal, alkali metal, alkaline earth metal and rare earth metal.

6. Articles resulting from processing a polymer network composition according to claim 1, wherein processing includes a curing step so that the gel point of the polymer network is reached or exceeded.

7. Polymer network composition according to claim 1 wherein the polymer network comprises polymeric crystallizable fragments of poly(butylene terephthalate) or polyethylene terephtalate.

8. Polymer network composition according to claim 5, wherein the catalyst is selected from the group consisting of: salts of Zn, salts of Ti and mixtures thereof.

9. Polymer network composition according to claim 1, having an enthalpy of melting as measures by DSC superior or equal to 20 J/g.

10. Polymer network composition according to claim 1, having a crystallinity superior or equal to 10 percent.

* * * * *